May 23, 1933.  J. H. SHERRARD  1,910,642

PIPE

Filed July 9, 1930

Inventor
J. H. Sherrard
By
Attorney

UNITED STATES PATENT OFFICE

JAMES H. SHERRARD, OF WESTMOUNT, QUEBEC, CANADA

PIPE

Application filed July 9, 1930. Serial No. 466,739.

This invention relates broadly to improvements in pipes for conducting fluids and to the process of making same and relates more particularly to pipes designed to conduct fluids under pressure, for example, water, oil or gas, and the primary object of the invention is to provide a light, relatively inexpensive and easily manufactured pipe capable of withstanding high internal pressure without bursting or leaking. A further object is to provide a pipe as aforesaid having great girder strength, so that it will not fail if supported only at the ends or at the centre and heavily loaded at unsupported points. A still further object is to provide a pipe which will be proof against corrosion due to oxidation or to acid or alkaline conditions either inside or outside the pipe and also proof against destruction by electrolysis. Another object is to provide a pipe having the fluid tight characteristics and strength of iron or steel pipe combined with the advantage of cement pipe. Still another object is to provide a pipe so constructed that adjoining lengths thereof may be easily and securely connected and the joints rendered absolutely fluid tight. Various other objects and the advantages of the invention may be ascertained from the following description and the accompanying drawing.

The medium and larger sizes of pipes now generally used for conducting water or other fluids may be roughly divided into three classes, namely;—metal (either cast iron or steel plate), cement concrete and wood. Each class of pipe has its peculiar advantages and disadvantages which are well known and need not be recited in detail.

Pipes made according to this invention have to a large extent the advantages of both metal pipes and concrete pipes, while avoiding in large measure the disadvantages of metal and concrete.

To accomplish the foregoing, the pipes are formed with a relatively thin metal core externally reinforced by circumferential and longitudinal metal members, so as to have the strength and freedom from leakage of ordinary metal pipes. This core is internally protected against corrosion and oxidation by a lining of cement concrete or other suitable material and is similarly externally protected by a covering of cement concrete or other suitable material, reinforced if necessary.

In the manufacture of these pipes, the circumferential reinforcement of the core is in the form of one or more strands of metal of high tensile strength and low factor of elongation wound helically upon the shell under considerable tension and suitably secured against unwinding and against lowering of the tension. The longitudinal reinforcing members are suitably secured at a plurality of points in their lengths to the circumferential reinforcing, preferably by welding or brazing.

If the internal lining is of cement concrete or other material which shrinks on setting and thus tends to separate from the metal core, the lining is preferably put in place and allowed to set before the circumferential reinforcing is put on. Application of the circumferential reinforcing subsequent to setting and shrinking of the lining causes the thin metal core to be contracted into close engagement with the lining so that the lining is supported in compression and thus prevented from expanding and cracking when the pipe is subjected to internal pressure.

The longitudinal reinforcement imparts girder strength to the pipe and, by reason of attachment to the circumferential reinforcement, equalizes any difference in the tensions of the adjacent helices of the circumferential reinforcement.

The rough exterior surface formed by the reinforcements constitutes an excellent bonding surface to hold the external covering which may be reinforced within itself.

That embodiment of the invention now preferred is illustrated in the accompanying drawing, together with certain modifications of detail, but it will be understood the invention is not confined to the embodiment or to the modifications illustrated or to the details thereof, as numerous other modifications of detail may be made.

In the drawing:—

Figure 1:
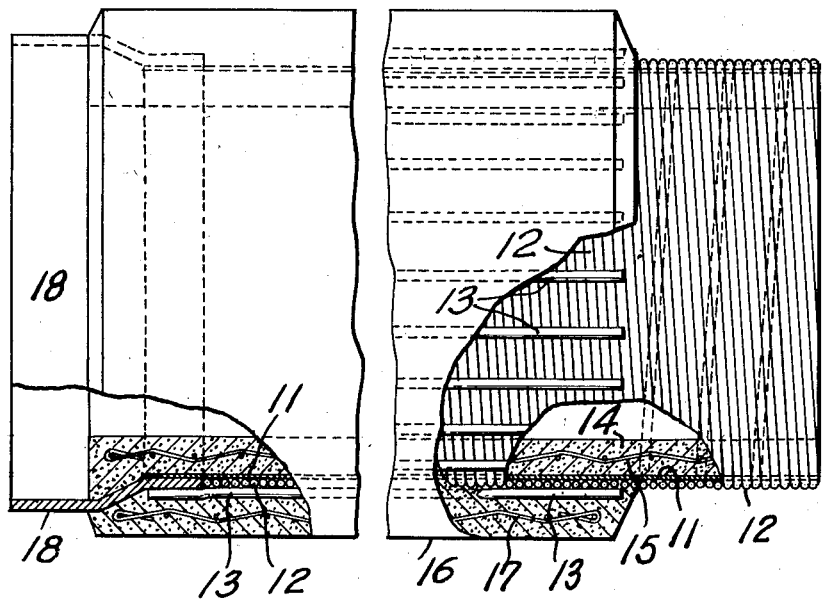
Fig. 1 is a plan view of a length of pipe with part of the outer covering broken away and parts in longitudinal section to show the construction and manner of joining to an adjoining length.
Figure 2:
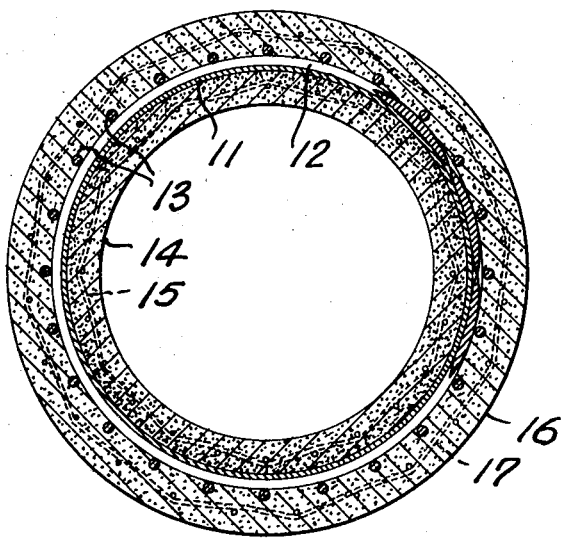
Fig. 2 is a cross-sectional view of the pipe.

Referring more particularly to the drawing, 11 designates a tubular metal core preferably formed of a thin metal plate bent to tubular form and having its meeting edges welded together to form a fluid tight structure. As exemplary of this core, it may be stated that for pipes 2 feet to 4 feet in diameter, it is now preferred to make the core of steel plate approximately one-sixteenth of an inch thick, but it will be understood the invention is not in any way confined to this thickness of metal and that the metal may be thinner or thicker in these sizes of pipes as well as pipes or larger and smaller sizes. The core 11 has tightly wound thereon one or more reinforcing bands or wires 12 which may be of the circular cross-section shown or of any other cross-section. The reinforcing 12 is preferably wound helically and under considerable tension with the helices packed tightly against each other. The winding may take the form of a single strand continuous from end to end of the core but is preferably in the form of a plurality of parallel strands each continuous from end to end of the shell and forming a plurality of parallel helices. The number of strands which it is expedient to wind in parallel will depend on the diameter of the core, larger diameters permitting the use of a larger number of strands in parallel without causing undesirably great angular pitch in the helices. The strands are preferably formed of steel of high tensile strength and low elongation factor. The cross-sectional area of the strand or strands depends entirely upon the internal pressure which the pipe is designed to withstand. While only one layer of winding 12 is illustrated, it will be obvious the number of layers may be increased. At each end of the core, the ends of the strands are secured in any suitable manner so as to retain the tension, for example, by welding the end portions of the strands to the core 11. In addition, adjacent helices of the strands may be welded together or welded to the core, or both, at intermediate points in the length and circumference of the core. A series of bars 13 located substantially parallel with the core axis and each extending substantially from end to end of the core 11 are welded or otherwise suitably secured to the winding 12 and constitute longitudinal reinforcement to impart girder strength to the finished pipe. The number and cross-sectional area of the bars depends upon the diameter of the pipe and the stresses to which it will be subjected normally. In any case, the number and cross-sectional area of the bars will be such that the pipe may be supported at the ends only and loaded at the centre or supported at the centre only and loaded at the ends without damage to the pipe. It is preferred to have the metal structure just described of sufficient strength to withstand all internal pressures to which the finished pipe will be subjected. In resisting external pressures, the strength of the core is supplemented by that of the lining and outer covering.

The core 11 is preferably provided with a lining 14 of any suitable material which may, if desired, be provided with reinforcement 15. The lining may be of bituminous material such as pitch or proderite or of cementitious material such as Portland cement concrete or asphaltic concrete or of any other material suitable to the purpose for which the pipe is intended. The lining is preferably so compact and dense and of such nature that it will prevent the fluid flowing through the pipe reaching the core, especially if the fluid is of such nature that it would corrode the core.

The outer surface of the core and the reinforcement thereof are protected by an external covering 16 of any suitable material such as cement concrete, proderite, asphaltic concrete, which is preferably provided with reinforcement 17. The rough outer surface of the reinforced core constitutes an excellent bonding surface to hold the outer covering 16 and the reinforcement 17 holds the outer covering against dislodgement in the event of fracture. The outer covering, besides protecting the metal core and its reinforcement from corrosion and oxidation, serves also as armour to protect it against mechanical damage and adds strength and stiffness to the structure. It will be understood, however, that the outer covering may be merely a thin coating of bituminous or other suitable material.

A great variety of means may be adopted to connect the lengths of pipe together and it will be understood the invention, as regards the structure thus far described, is not confined to any particular formation for connection. One method of providing for connection comprises the attachment of a short metal sleeve 18 to one end of the core, preferably by welding. As shown in Figure 1, this sleeve is outwardly offset beyond the end of the core to form the conventional bell mouth. The thickness of the metal forming the sleeve may be such that no reinforcement, such as is provided for the core, will be required or the reinforcement may be continued over the sleeve which may be then formed of relatively thinner metal than shown in Figure 1.

Figure 3:
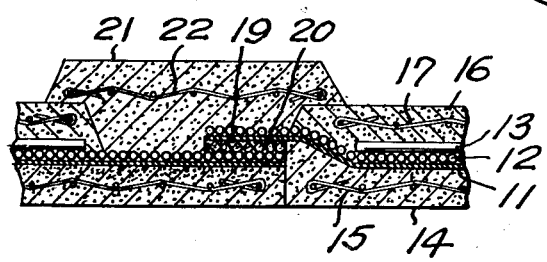
Fig. 3 is a fragmentary longitudinal sectional view showing a modified form of end.

Alternatively, the end of the core may be expanded to larger diameter as shown at 19, Figure 3, and the winding 12 continued over the expanded portion. Preferably the outer covering 16 is omitted over the bell mouth. No special formation is required at the opposite end of the pipe beyond the omission of the outer covering (if of material thickness) for a sufficient distance to enable the core to be inserted in the bell mouth of the adjoining pipe. Obviously the inner lining 14 (if of material thickness) must be omitted in the bell mouth to permit introduction of the end of the adjoining pipe. The longitudinal reinforcing 13 may be omitted from the exposed ends of the core. The bell mouth or female end of each pipe is formed sufficiently larger than the male end so as to leave an annular space between the telescoped ends of adjoining pipes in which to insert caulking or the like, designated 20 (Figure 3). The rough outer surface of the reinforced core exposed at the male end of the pipe will serve to hold the caulking against being blown out by pressure within the pipe. In order to complete the joint, the space between the ends of the outer coverings of the assembled pipe lengths is filled with material, designated 21, similar to the outer covering or of other suitable nature, and this material may project beyond the outer surface of the pipe lengths and may be provided with reinforcement 22. When the pipe lengths are properly assembled, the ends of the inner linings (if these are of material thickness) are in abutting relation and the metal male end of one length is centered in and out of contact with the metal female end of the adjoining pipe. The caulking used is preferably highly dielectric and therefore serves to electrically insulate the metal cores of the pipe lengths from each other so that flow of electric fluid through the assembled pipe is largely or wholly prevented and thus largely prevents electrolytic destruction of the metal parts of the pipe.

The pipe hereinbefore described may be manufactured by any suitable process. When the pipes are formed with a lining of material thickness, especially a lining which shrinks on setting and contracts or tends to contract away from the core, it is preferred to line the cores before winding them with the reinforcement 12. After the lining has set and the shrinkage occurred, the reinforcement 12 is applied under such tension that it contracts the core 11 upon the lining sufficiently to at least offset the shrinkage of the lining and ensure tight permanent contact between the core and lining. Preferably the tension of the winding and the contraction of the core are such that the lining is placed in compression so that if it has tendency to fracture, fractures will not develop into open cracks under conditions of internal pressure. In this way, a very strong bond is effected between the core and the inner lining, which adds materially to the girder strength of the pipe by causing the lining opposite the tensioned members 13 to become a longitudinal compression member. This tight engagement of the core and lining also adds materially to strength of the pipe in resisting external crushing pressure since it opposes the entire thickness of the pipe wall at the one time to the crushing pressure, whereas if the lining were loose in core only the strength of the outer covering and core would be opposed to the pressure. Altogether apart from the question of co-operation between the winding and lining, the initial tension of the winding serves to develop its strength from the outset and to prevent any swelling of the core when subjected to internal pressure.

If the lining is of material which permits it, for example cement concrete, it is introduced in sufficiently fluent form to permit of centrifugal consolidation by rotating the core and contained mortar around its axis, in the well known manner and with the well known advantages. Where the lining is reinforced, the lining may be applied in separate layers and the reinforcement introduced between the layers or the reinforcement may be initially suitably supported in the core so as to become embedded in the lining as the latter is formed. This latter method is preferred. Where the lining is of plastic material which cannot be applied centrifugally, it preferably is applied under pressure or compressed after application so as to ensure the requisite density and freedom from voids as well as perfect contact with the core. The lining may even be a preformed tube of proderite, earthenware or other material or an assemblage of blocks or tiles. After the lining is in place, the lined core is preferably mounted on a mandrel and rotated while the winding is applied, but in some instances the lined core will be sufficiently rigid to enable the mandrel to be dispensed with. Obviously, if the lining is of such nature that it does not add to the stiffness of the core, the lining may be applied at any time after the core is wound. The outer covering and its reinforcement, if any, may be applied in any suitable way and compacted as necessary.

From the foregoing description, it will be seen that the finished pipe will be absolutely fluid tight because of the metal core and will have any desired strength according to the reinforcement of the core without the weight of cast iron pipe or the weight and bulk of ordinary cement pipe. Internal and external coverings of cement concrete will give the pipe all the advantages of cement pipe without any of its disadvantages. Furthermore, the lining and covering may be of material best adapted to the service conditions under which the pipe will be used. The pipe may be manufactured easily and at small cost in the vicinity of its use, thus avoiding heavy freight costs. When a very cheap strong pipe is required, the lining and armouring may be omitted and the reinforced core used with or without a thin coat of pitch or other inexpensive material in exactly the same way as ordinary iron pipe is used. In the fully lined and covered pipe, the metal is protected from corrosion, oxidation and electrolysis and should, therefore, be more durable than ordinary iron or steel pipe.

Having thus described my invention, what I claim is:—

1. A pipe comprising a rigid cemental lining, a thin-walled metal core compressed upon said lining, a tensioned metal band wound helically about said core, longitudinal reinforcing bars secured to said bands, and a cemental covering for the core, band and bars.

2. A reinforced concrete pipe including an internal shell of cementitious material; a tubular metal core, constituting a fluid seal, surrounding said internal shell; reinforcing for said internal shell and metal core in the form of a helical metal band wound tightly about said metal core and members extending longitudinally of said metal core, welded to said metal band, to impart girder strength to the pipe; and a surface coating of cementitious material covering said metal reinforcing.

3. A reinforced concrete pipe including an internal shell of reinforced concrete; a tubular metal core, constituting a fluid seal, surrounding said internal shell; reinforcing for said internal shell and metal core in the form of a helical metal band wound tightly about said metal core and members extending longitudinally of said metal core, welded to said metal band, to impart girder strength to the pipe; and a surface coating of cementitious material covering said metal reinforcing.

4. A reinforced concrete pipe including an internal shell of cementitious material; a tubular metal core, constituting a fluid seal, surrounding said internal shell; reinforcing for said internal shell and metal core in the form of a helical metal band wound tightly about said metal core and members extending longitudinally of said metal core, welded to said metal band, to impart girder strength to the pipe; and a surface coating of reinforced concrete over said metal reinforcing.

5. A reinforced concrete pipe including an internal shell of reinforced concrete; a tubular metal core, constituting a fluid seal, surrounding said internal shell; reinforcing for said internal shell and metal core in the form of a helical metal band wound tightly about said metal core and members extending longitudinally of said metal core, welded to said metal band, to impart girder strength to the pipe; and a surface coating of reinforced concrete over said metal reinforcing.

6. A composite pipe including a tubular metal core, external circumferential reinforcing means in close engagement with said core, longitudinal reinforcing means in contact with said circumferential reinforcing means, a lining of cementitious material for the core, metallic reinforcement in said lining and spaced from the core, a covering of cementitious material enclosing the core reinforcement, and a reinforcement for said cover separate from the core reinforcement.

7. A composite pipe including a thin walled fluid tight sheet metal core, external reinforcement for said core comprising a helical metal member wound tightly upon the core and longitudinal reinforcing members outside said winding and connected thereto, a cementitious lining for the core, reinforcement for said lining embedded therein and separate from the core, an outer covering of cementitious material enclosing the core reinforcement, and a reinforcement for said cover embedded therein and separate from the core reinforcement.

In witness whereof, I have hereunto set my hand.

JAMES H. SHERRARD.